(12) United States Patent
Michaud et al.

(10) Patent No.: US 6,468,144 B1
(45) Date of Patent: Oct. 22, 2002

(54) SAUSAGE LINK FORMING MACHINE

(75) Inventors: Ghislain Michaud, Rosemere; Denis Michaud, Lachine, both of (CA)

(73) Assignee: D.M.P. Industries Inc., Terrebonne (CA)

( * ) Notice: Subject to any disclaimer, the term of this patent is extended or adjusted under 35 U.S.C. 154(b) by 0 days.

(21) Appl. No.: 09/242,879

(22) PCT Filed: Aug. 27, 1996

(86) PCT No.: PCT/CA96/00584

§ 371 (c)(1),
(2), (4) Date: Mar. 10, 2000

(87) PCT Pub. No.: WO98/08392

PCT Pub. Date: Mar. 5, 1998

(51) Int. Cl.[7] ............................................. A22C 11/02
(52) U.S. Cl. ....................................................... 452/46
(58) Field of Search ............................ 452/46, 47, 48, 452/51

(56) References Cited

U.S. PATENT DOCUMENTS 5,480,346 A * 1/1996 Kasai et al. .................. 452/46

* cited by examiner

*Primary Examiner*—Charles T. Jordan
*Assistant Examiner*—Francis T. Palo
(74) *Attorney, Agent, or Firm*—Swabey Ogilvy Renault; Guy J. Houle

(57) ABSTRACT

A sausage link forming machine having a rotating frame secured on a drivable axle and wherein the frame has opposed parallel discs. Control cams are secured to the axle intermediate the discs. A plurality of sausage grasping head assemblies are secured between the discs and equidistantly spaced apart along a circular path. A link forming pincer mechanism is secured between each of the grasping head assemblies. These head assemblies have rotatable support rollers which are displaceable towards one another from a sausage casing receiving position to a sausage casing engaging position. A first cam follower is associated with each of the grasping head assemblies and engages a first cam portion of the control cam to displace the support rollers. A second cam follower is associated with each of the link forming pincer mechanisms and engages a second cam portion to cause the fork members to pivot to and away from one another. The support rollers are axially rotated and the forks grasp and compress a portion of the elongated sausage casing to form a sausage link twisted connection between adjacent ones of the grasping head assemblies in a portion of the rotating frame.

15 Claims, 9 Drawing Sheets

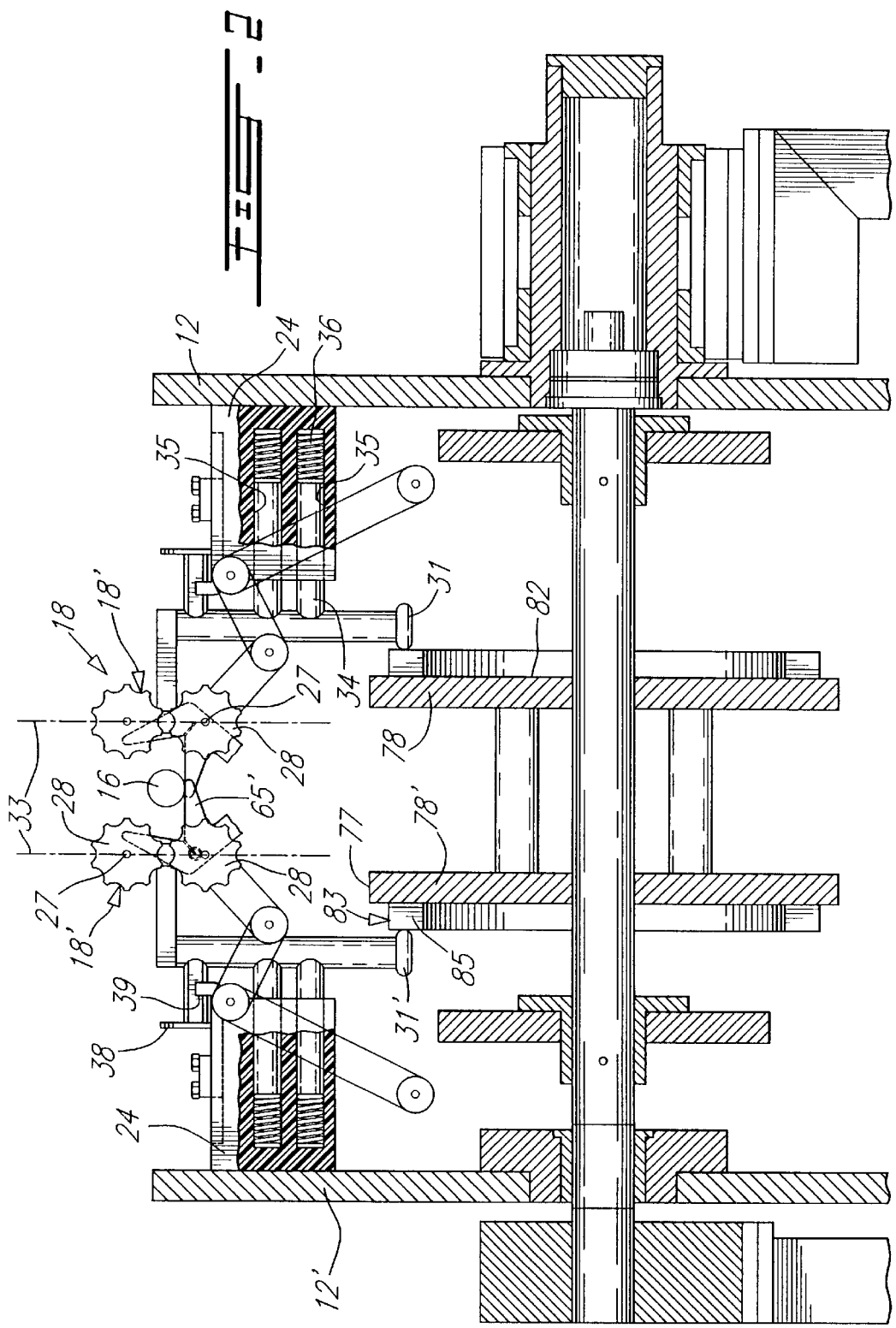

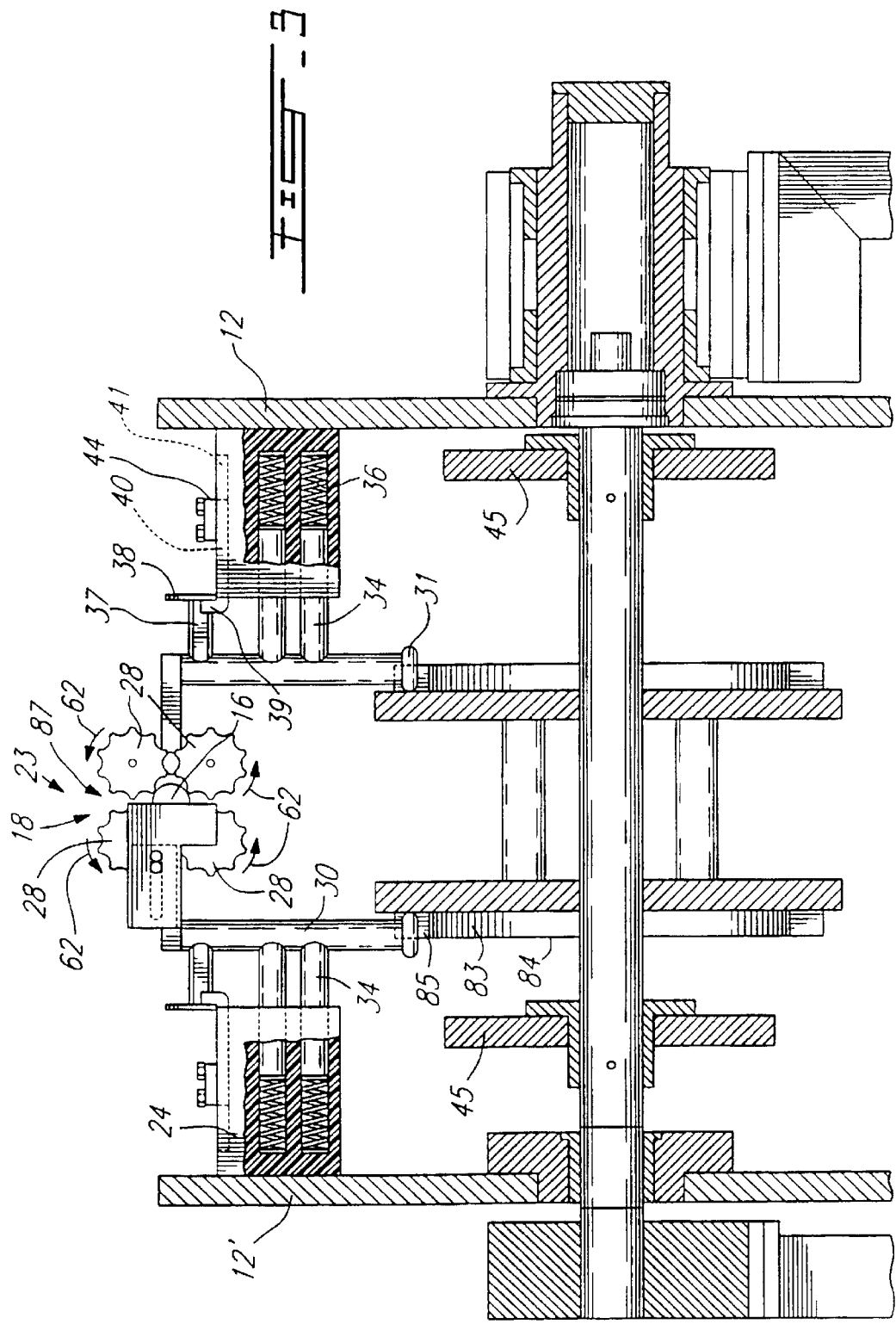

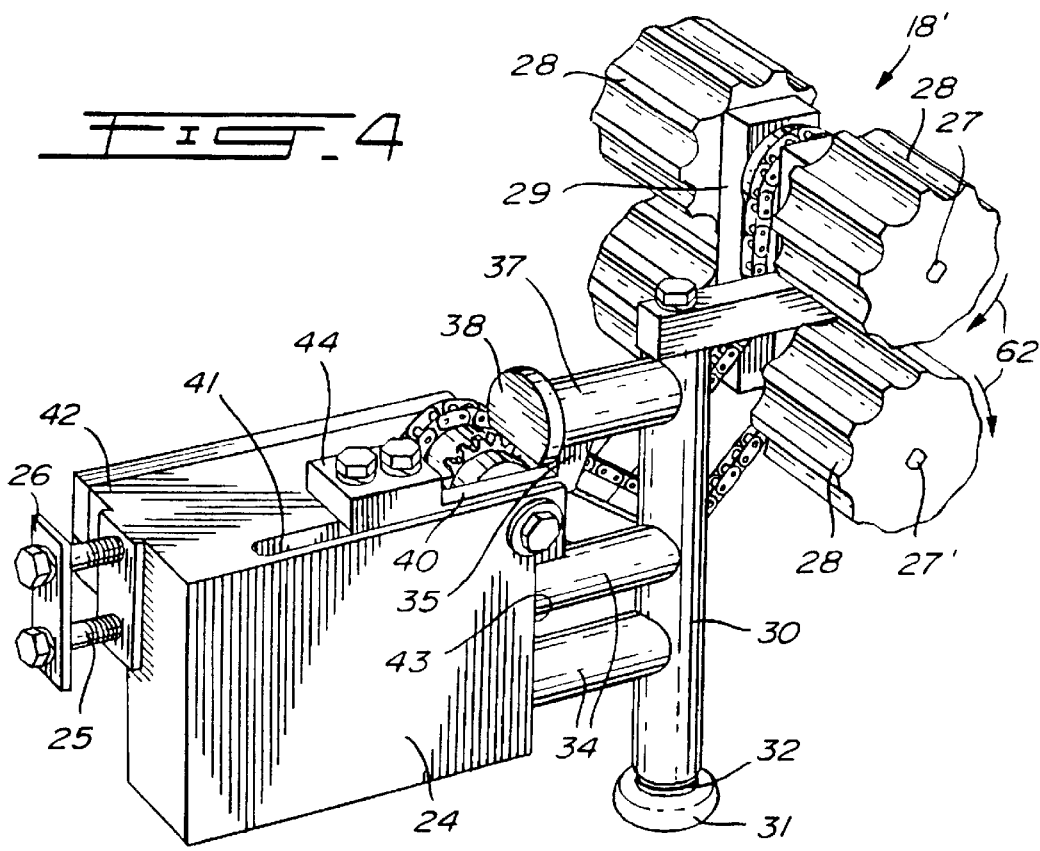
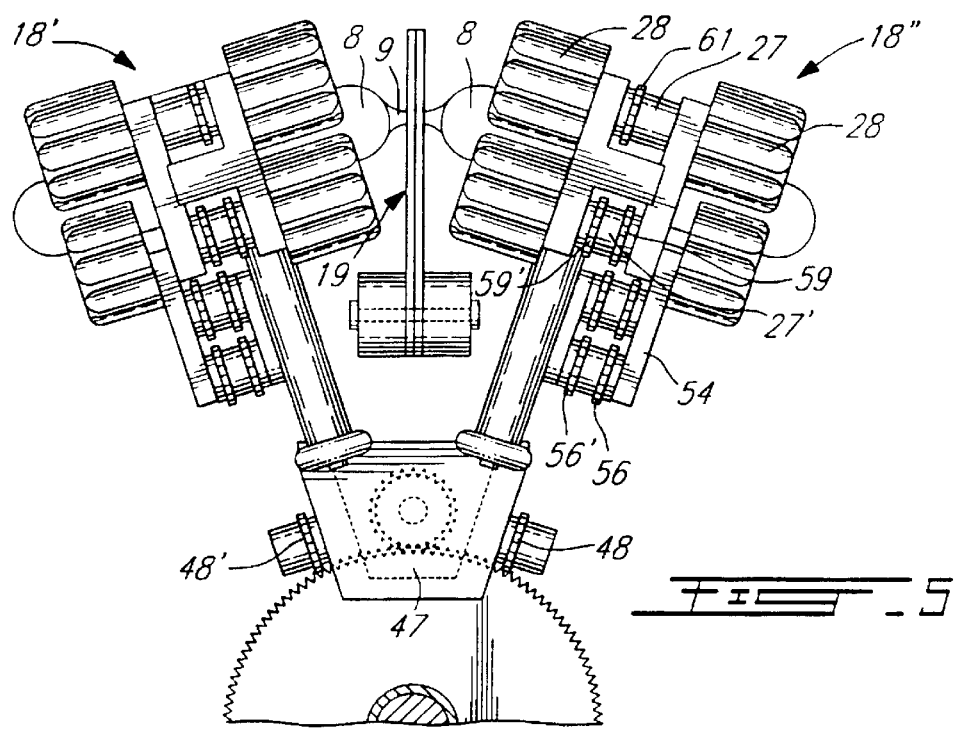

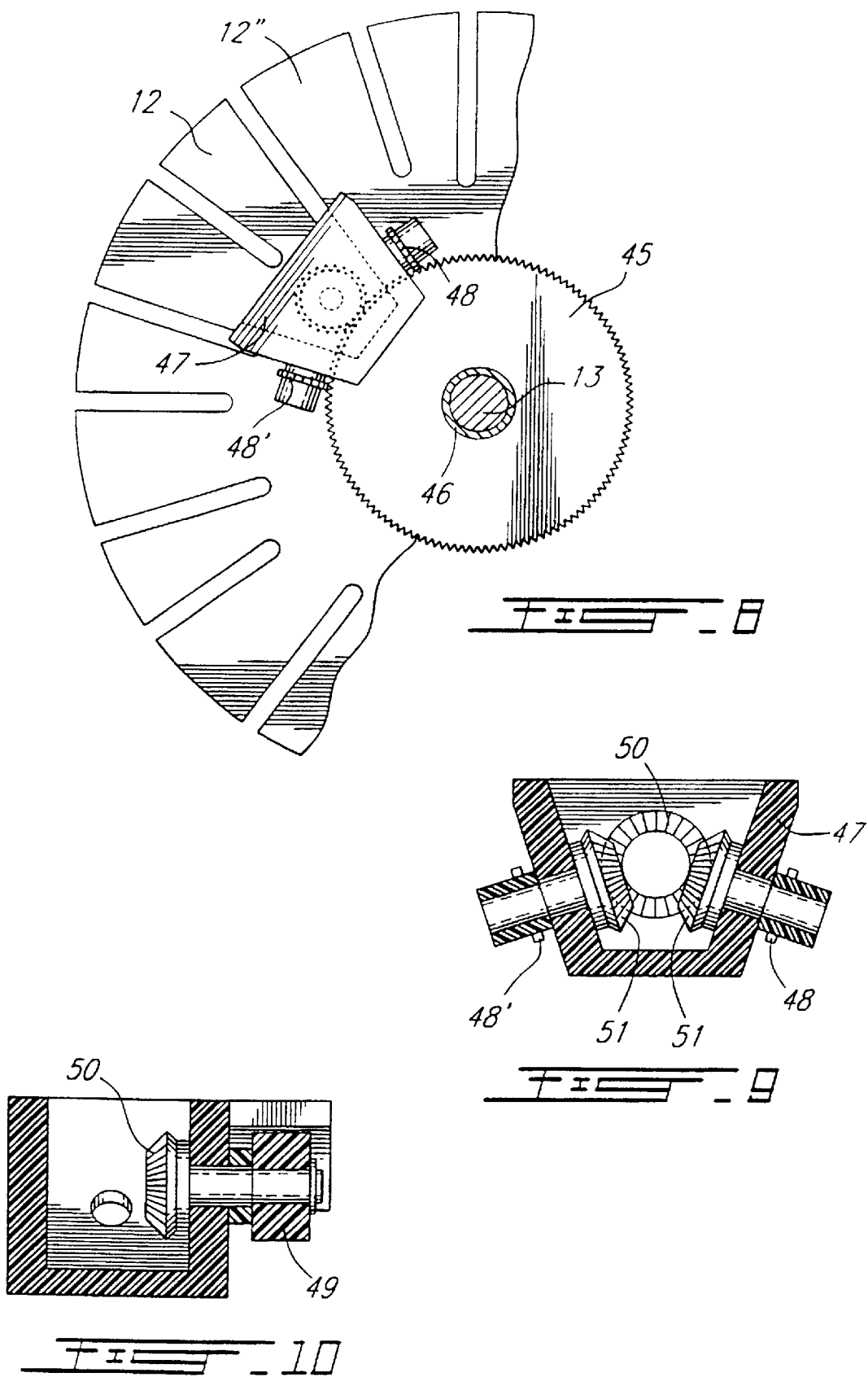

SAUSAGE LINK FORMING MACHINE

BACKGROUND OF INVENTION

1. Field of Invention

The present invention relates to a sausage link forming machine capable of forming sausage links from an elongated sausage casing and severing the links at individual link connections or at predetermined link connections and wherein the machine is compact, easy to assemble and repair, provides adjustments to handle sausage casings of different diameters, and wherein the sausage links are formed with end link twisted connections which substantially conceals the foodstuff at the end of the sausage link.

2. Description of Prior Art

Various machines have heretofore been provided for forming and handling sausage links. However, many of these machines have proven unreliable and result in numeral machine stoppages because the sausage casing bursts when mishandled by the machine. Furthermore, sausage links formed by many of these machines are often not appealing to the eye as the foodstuff protrudes from the partly closed ends of the sausage link casing because these ends are not properly formed. Still further disadvantages of known sausage link forming machines is that these machines are difficult to clean when a sausage casing bursts rendering the machine non-hygienic, they are difficult and time consuming to repair often shutting the link former for several hours. This becomes a very costly and time consuming process. A still further disadvantage of known sausage link forming machines is that they are very slow and require personnel to monitor the operation of the machine, to inspect each of the sausage links to make sure that they are well formed and to manually group the links in individual packages.

Most sausage link forming machines can only handle sausage casings of predetermined diameter and are not adaptable to other casing sizes. Consequently, additional machines must be provided to handle different size of sausage casings.

There is also a need to provide a very compact sausage link forming machine which does not occupy much space and which also provides easy visual inspection during the operation of the machine to identify problem areas. There is also the need to provide a sausage link forming machine which is reliable while at the same time capable of operating at high speeds to form at least 600 links of sausages per minute. A further need is to provide sausage links wherein the ends of the sausage are twisted to prevent the foodstuff from exiting from the ends of the sausage links and further to provide a machine which can handle sausage casings formed of synthetic or natural skin.

It is known from International Publication No. WO 94/23584, filed on Apr. 15, 1994, to mount pincer assemblies between rotating discs and to operate the pincer assemblies by cams whereby to form twisted link connections in a sausage casing. While the casing is pinched, the sausage link being formed is twisted. It is also known from European Patent Application 0 069 544 to provide a severing means to cut the chain of sausages into separate links. In document WO 94/23584, there is also shown roller assemblies which pinch the sausage casing to impart a twisting action to the sausage links. However, it is pointed out that this apparatus is extremely difficult to assemble and repair due to the fact that they are assembled in component parts on the machine. When a malfunction occurs it is necessary to idle the machine for long periods of time to effectuate repairs. Thus, there is the need to provide for grasping head assemblies which are easy to remove from the machine and quickly replaced by another assembly with ease and within a relatively short time period. There is also a need to provide for ease of adjustment of such assemblies to adapt a casings of different diameters.

SUMMARY OF INVENTION

It is therefore a feature of the present invention to provide a sausage link forming machine which substantially overcomes all of the above-mentioned disadvantages of the prior art and provides the desired needs.

According to a broad aspect, the present invention provides a sausage link forming machine which comprises a rotating frame secured on a drivable axle. The frame has opposed parallel discs. Control cam means is secured to the axle intermediate the discs. A plurality of sausage grasping head assemblies are secured between the discs and equidistantly spaced apart along a circular path. A link forming pincer mechanism is secured between each of the grasping head assemblies. The grasping head assemblies have rotatable support rollers which are displaceable towards one another form a sausage casing receiving position to a sausage casing engaging position. First cam follower means is associated with each of the grasping head assemblies and engages a first cam portion of the control cam means to displace the support rollers to position same to the casing receiving position and the casing engaging position. Drive means is associated with each of the head assemblies to impart axial rotation to the support rollers. The link forming pincer mechanism has a pair of pivoting form members which define therebetween a restricted throat area to grasp and compress a portion of the elongated sausage casing to form a sausage link twisted connection between adjacent ones of the grasping head assemblies in a portion of the rotating frame. The pivoting fork members support the elongated sausage casing at the receiving section of the rotating frame. At least predetermined ones of the pivoting fork members have severing means to cut the sausage casing at the twisted link connection and at a discharge section of the rotating frame. Second cam follower means is associated with each link forming pincer mechanism and engages a second cam portion to cause the fork members to pivot to and away from one another. The forming machine is characterized in that the grasping head assemblies are formed by opposed sets of rotatable support rollers, with each set comprising a detachable support block detachably connected in transverse axial alignment to a respective one of the opposed parallel discs. At least part of the drive means is secured to the detachable support block. Each of the support blocks are each secured to a diametrically extending open-ended block connecting slot formed in a peripheral end portion of the opposed parallel discs.

BRIEF DESCRIPTION DRAWINGS

A preferred embodiment of the present invention will now be described with reference to the accompanying drawings in which:

FIG. 2 is a simplified side view illustrating the position of the sausage grasping head assemblies as well as the link forming pincer mechanism at the casing receiving position of the machine;

FIG. 3 is a simplified side section view similar to FIG. 2, but illustrating the grasping head assemblies in a closed position in engagement with the sausage casing and the construction of the support roller connection to a detachable support block;

FIG. 4 is a perspective view showing the construction of a portion of the sausage grasping head assembly;

FIG. 5 is a side view showing two portions of adjacent sausage grasping head assemblies and their cam follower mechanism together with the position of the link forming pincer fork members therebetween;

FIG. 8 is a schematic view showing the position of a gear box associated with the stationary drive gear;

FIG. 9 is a section view of one of the the gear boxes;

FIG. 10 is a further section view of the gear box of FIG. 9;

DESCRIPTION OF PREFERRED EMBODIMENTS

Figure 1:
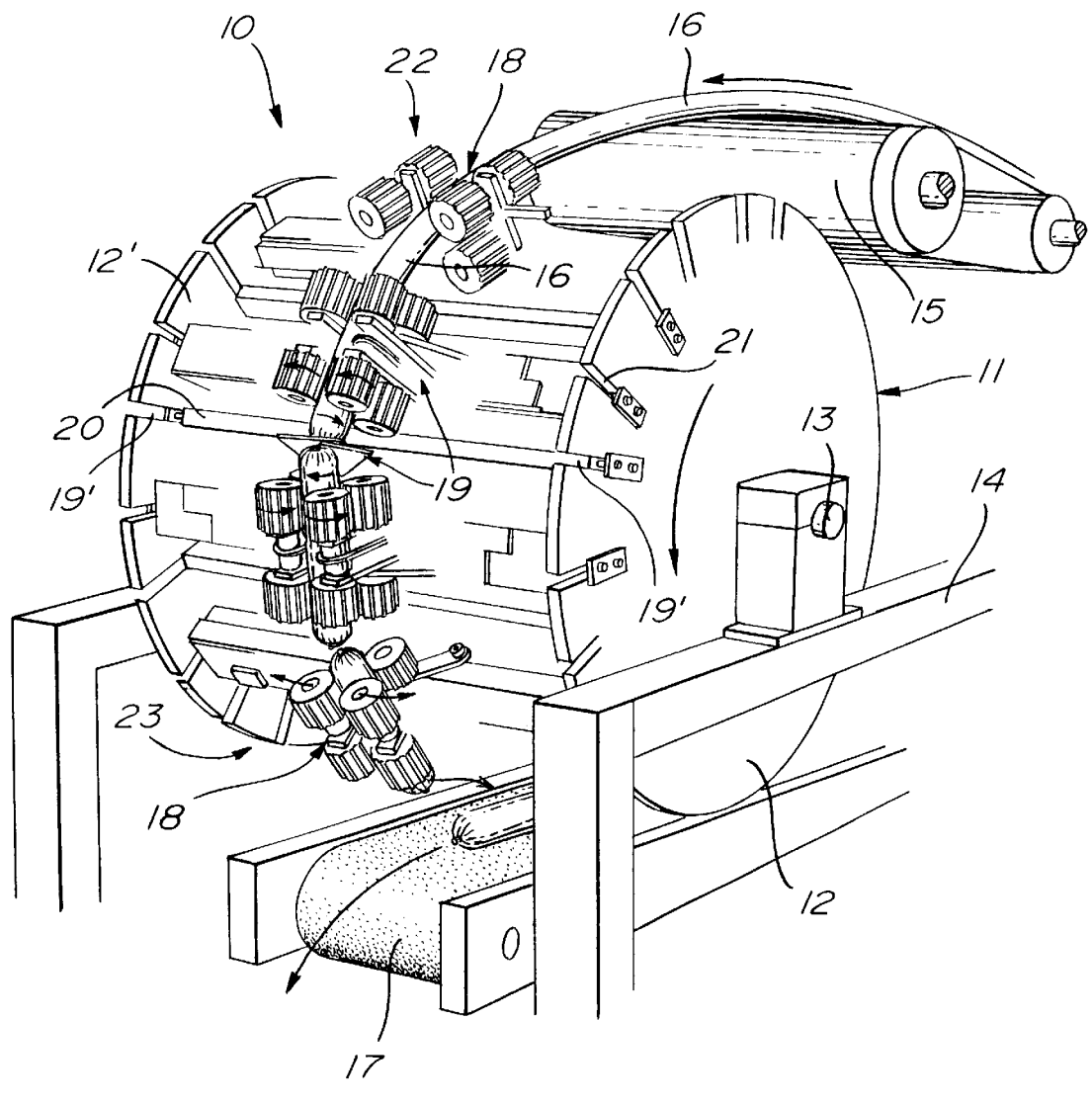
FIG. 1 is a perspective view of a sausage link forming machine constructed in accordance with the present invention.

Referring now to the drawings, and more particularly to FIG. 1, there is shown generally at 10 the sausage forming machine of the present invention. The machine 10 comprises a rotating frame which is formed by a pair of opposed parallel circular discs 12, 12' which are rotatably supported on a drivable axle 13 which is coupled to suitable drive means, not shown herein. The rotatable frame 11 is supported on a stationary frame 14 to position the rotatable frame relative to an in-feed conveyor 15 on which an elongated sausage casing 16 is fed. A discharge conveyor 17 is located below the rotating frame 11 to convey formed sausage links away from the machine after they have been severed and released.

As herein shown, the link forming machine 10 has a plurality of sausage grasping and rotating head assemblies which are detachably secured to the parallel circular discs 12 and 12' and engageable in connecting slots 19'. A link forming pincer mechanism 19 is also removably secured intermediate opposed ones of the sausage grasping and rotating head assemblies 18. The link forming pincer mechanism 19 is secured to a support rod 20 also detachably secured in rod connecting slots 21 provided in the discs 12 and 12'. Accordingly, individual ones of the link forming pincer mechanisms as well as the sausage grasping and rotating head assemblies are detachably connected to provide ease of maintenance, repair, and adjustment. As shown in FIG. 1, the sausage casing 16 is fed at a casing receiving position 22 on top of the Ferris wheel-like rotating frame 11 wherein the sausage grasping head assemblies 18 and the link forming pincer mechanism 19 are in a sausage casing receiving position, as will be described later and as illustrated in FIG. 2.

Figure 6:
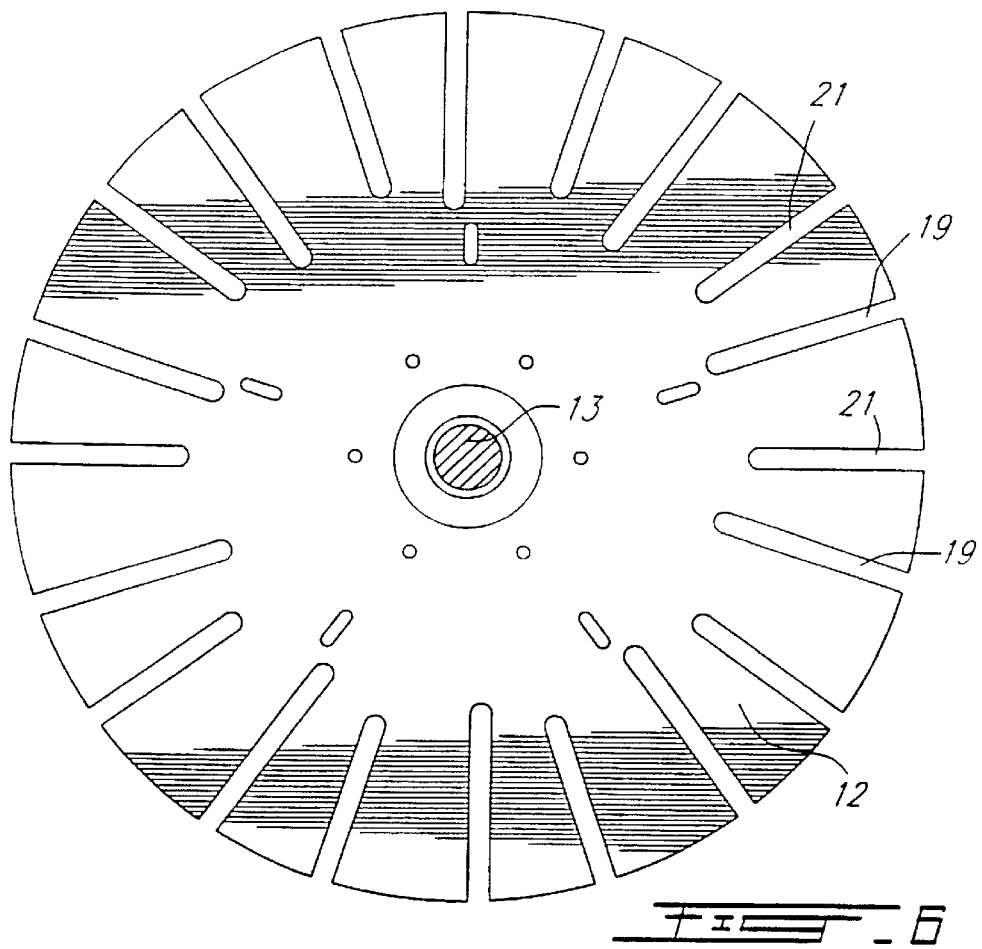
FIG. 6 is a side view showing the construction of one of the opposed parallel discs of the forming machine.
Figure 17:
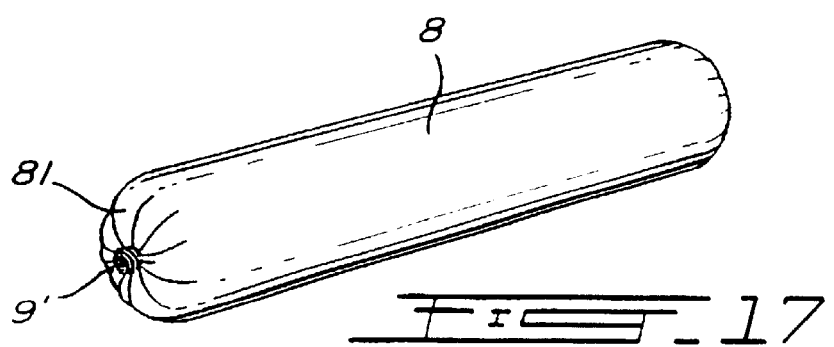
FIG. 17 is a further perspective view showing a sausage link formed by the forming machine of the present invention.

Referring now additionally to FIGS. 2 to 5, there will be described the construction of the sausage grasping head assemblies which are equidistantly spaced apart along a circular path defined between the rotating circular discs 12 of the machine 10. As shown in FIG. 2, each of the sausage grasping head assemblies 18 comprises opposed sets 18' of rotatable support rollers 23. FIG. 4 illustrates one of these sets 18' of support rollers and its assembly. As herein shown, the rollers 23 are connected to a detachable block 24 which is detachably connected in the transverse axially aligned connecting slots 19' of the discs 12 and 12' (see FIG. 6). A pair of bolts 25 and a clamp plate 26 permit this securement from the exterior wall of the discs. Accordingly, by loosening the two bolts 25 and disconnecting the drive link chain 50 (see FIG. 17), as will be described later, the entire rotatable support roller assembly or set 18' can be removed from the machine. The roller set assembly 18', as shown in FIGS. 4 and 5, is comprised of a pair of roller support shafts 27, each having a pair of rollers 28 secured thereto. The roller support shaft is secured to a roller support frame 29 which is in turn secured to a support arm 30. A cam follower wheel 31 is rotatably connected at the lower end 32 of the support arm 30. As shown in FIG. 2, the roller support shafts 27 of each set of rotatable support rollers 18' are spaced apart in a common plane 33 with the planes 33 of both sets 18' of support rollers lying parallel to one another and to the parallel discs 12.

Referring again to FIG. 4, it can be seen that the support arm 30 is provided with a pair of transverse connecting shafts 34 which, as shown in FIG. 2, are respectively received in sliding fit within respective cylindrical bores 35 formed within the support block 24. A helical spring 36 is located within the cylindrical bores and accordingly biases the support arm 30 outwardly and maintains it oriented parallel to the circular disc 12 and to the common plane 33 of the roller support shafts 27. These springs also permit the roller 28 to be displaced when the sausage casing is not of uniform diameter, and prevents applying excessive force on the casing which could cause the casing to burst.

Referring again to FIG. 4, the support arm 30 is provided at an upper end thereof with a rod member 37 having an arresting flange 38 at a rearward end thereof. As herein shown, the arresting flange 38 is abuttingly engaged with an upturned engaging free end 39 of a sliding plate 40 which is guidingly retained within a guide slot 41 formed in the top wall 42 of the support block 24. The upturned engaging free end 39 is disposed in obstructing relationship with respect to the arresting flange 38 to arrest a forward position of the support arm which is spring-biased outwardly of the side wall 43 of the support block 24. A clamp plate 44 secures the sliding plate 40 at a desired position within the guide slot 41. Accordingly, the common planes 33 of the roller support shafts 27 may be adjusted to accommodate therebetween sausage casings of different diametrical size. The rollers 28, as herein shown, are formed of Nylon and have a smooth serrated circumference for better engagement with the sausage casing 16 supported therebetween.

With additional reference to FIGS. 7 to 10, there will be described the drive means which imparts rotation to the rollers 28. The drive means is provided by a pair of stationary drive gears 45 having a coupling 46 which is immovably secured to the stationary frame 14. Accordingly, the stationary drive gears are stationary and the rotatable circular discs 12 and the support roller assemblies 18' rotate relative thereto. In the particular embodiment as herein shown there are ten sausage grasping head assemblies 18 disposed about the rotatable frame 11. The rollers 28 of adjacent assemblies 18' are caused to rotate in opposite direction by the provision of gear boxes 47 which are coupled to respective ones of the two drive gears 28. There are five gear boxes 47 secured to the inner surface 12' of each of the circular discs 12 and 12'. Accordingly, each gear box has two output drive sprockets 48 and 48' rotating in opposite directions. As shown in FIGS. 9 and 10, the gear box 47 is provided with a drivable gear 49 which is in meshing toothed engagement with the central drive gear 45 to impart axial rotation thereto. A inner beveled gear portion 50 coupled to the drivable gear is also disposed in meshing engagement with beveled gear heads 51 of the drive sprockets 48 and 48'. This imparts opposite axial rotations to the drive sprockets 48 and 48'. It is pointed out that the gear boxes as well as the drive gear on both sides of the head assemblies are positioned differently whereby both sets 18' of rollers 28 rotate in desired directions as indicated by arrows 62 in FIGS. 3 and 4.

Figure 7:
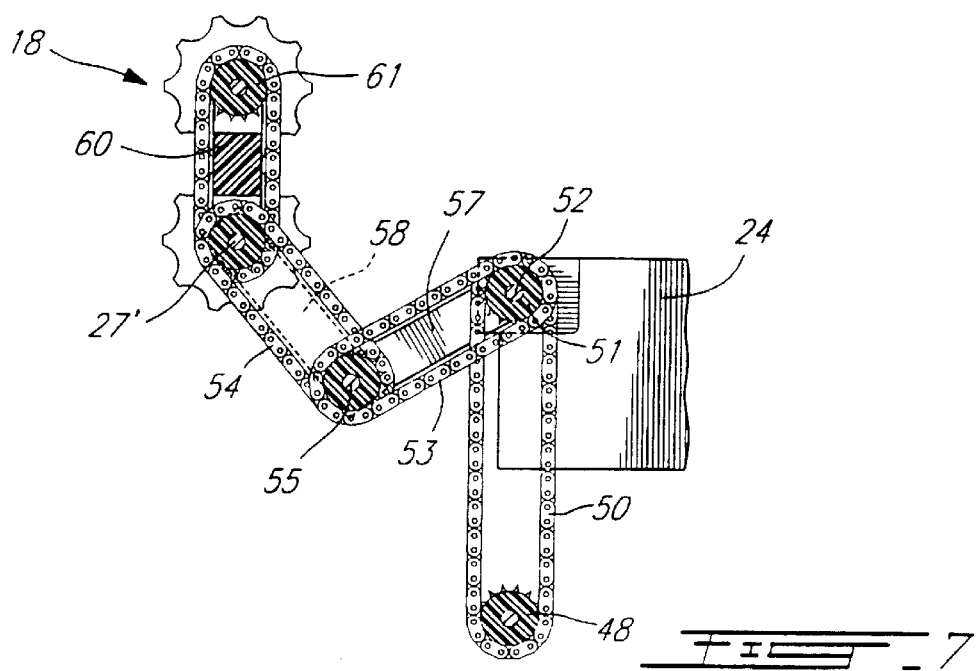
FIG. 7 is a simplified view showing the adjustable link connection between the support roller and their support block as well as the drive linkage.

As shown in FIGS. 5 and 7, only one of the drive sprockets 48 is herein shown and coupled to one portion of the sets 18' of rotatable support rollers. As herein shown, the drive sprocket 48 is connected by a link chain 50 to a further sprocket 51 immovably connected to a shaft 52 secured to the support block 24. A pair of link arms 53 and 54 are pivotally interconnected to one another at an intermediate pivot connection 55. The other end of the link arm 53 is pivotally connected to the shaft 52 while the other end of the link arm 54 is pivotally connected to the roller support shaft 27', see also FIG. 5. A pair of sprockets 56 and 56' are disposed about the intermediate pivot connection 55. Sprocket 56 is connected to a further link chain 57 which is also in engagement with the sprocket 51 to impart rotation to the sprocket 56' connected thereto. A further link chain 58 is engaged about the sprocket 56' and a sprocket 59 secured about the support shaft 27'.

This sprocket 59 when rotated also imparts rotation to sprocket 59' which is connected thereto and also rotatable about the roller support shaft 27'. Through a further link chain 60 and a further sprocket 61 secured on the roller support shaft 27, all of the rollers 28 are caused to rotate in a common direction, i.e., clockwise or counterclockwise. The arrows 62, as shown in FIGS. 3 and 4, indicate a clockwise rotation of the roller set 18'. The opposed roller set which forms a sausage grasping head assembly 18 will of course rotate in a counterclockwise direction, as shown in FIG. 3, whereby the sausage casing is grasped from four different locations thereabout and caused to twist, in this particular instance, in a counterclockwise direction. If we assume, with reference to FIG. 5, that the grasping head assembly 18 causes the sausage link grasped thereby to rotate in a clockwise direction, then the sausage head assembly 18" would rotate in a counterclockwise direction, which is in opposite direction, to impart a twist in the sausage casing link connection 9 therebetween, as herein shown in FIG. 5, thereby forming adjacent sausage links 8 separated by a twisted link connection 9.

In order to form the sausage link connection 9 and the sausage links 8, the link forming pincer mechanism 19 needs to be actuated, as will now be described.

Figure 13:
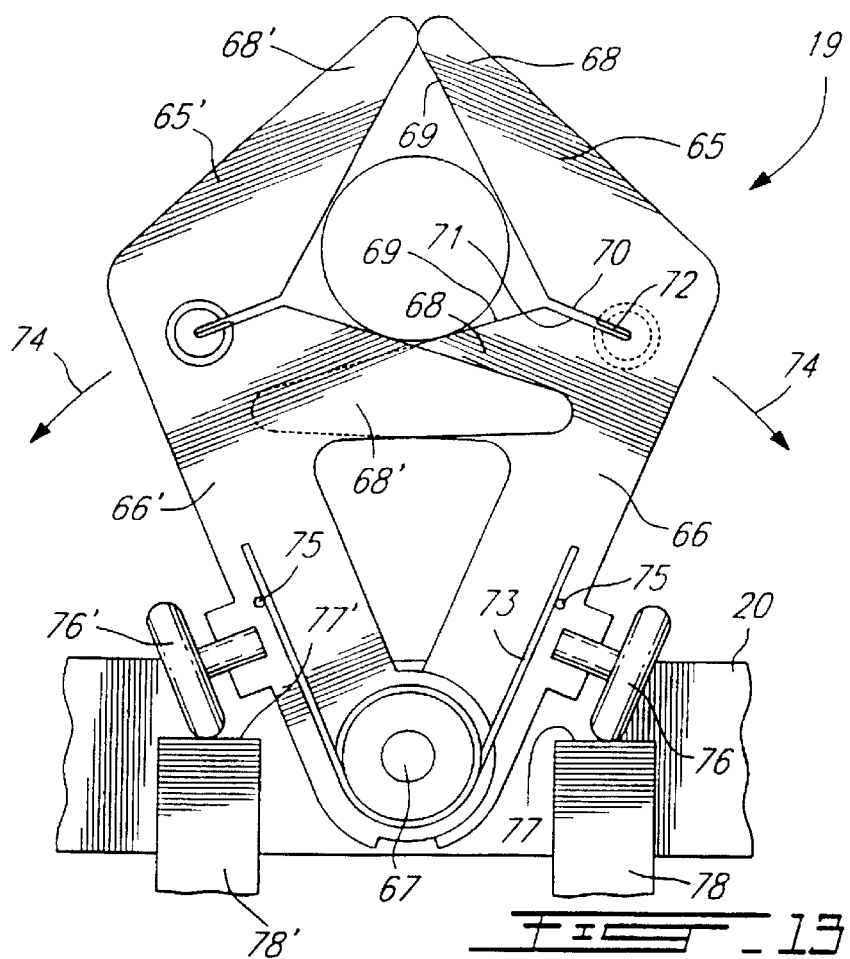
FIG. 13 is a side view showing the construction of the link forming pincer mechanism.
Figure 14:
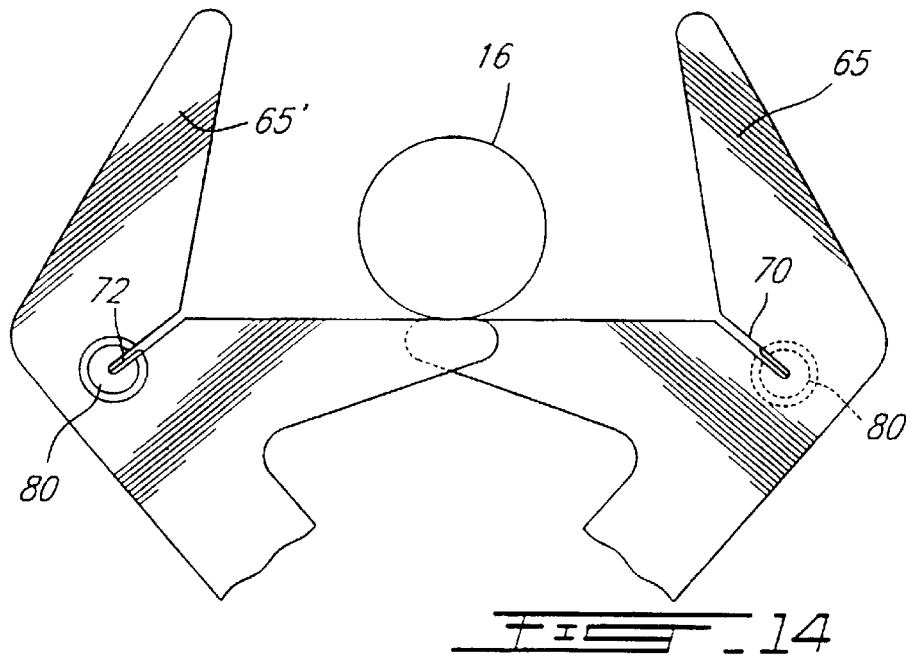
FIGS. 14 and 15 are further views showing the displacement of the pivoting fork members of the pincer mechanism during their travel through a section of the forming machine.
Figure 15:
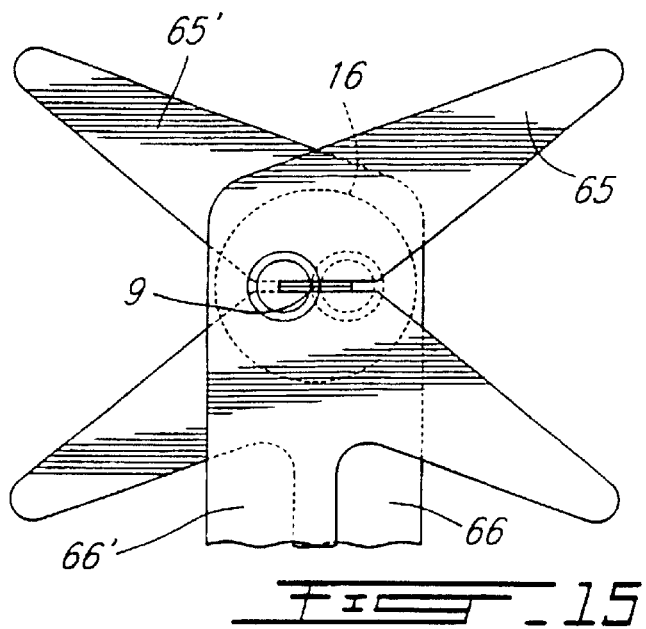

Referring now to FIGS. 13 to 15, there is shown the construction of the link forming pincer mechanism 19 which is detachably secured to the support rod 20 which is in turn detachably secured across the rod connecting slots 21 of the parallel circular discs 12 and 12', as shown in FIG. 1. The link forming pincer mechanism 19 is comprised of a pair of pivoting fork members 65 and 65', each having a connecting arm section 66 and 66', respectively, and each pivotally connected in facial contact about a pivot pin 67 which is secured to the support rod 20. Each fork member 65 and 65' has a pair of diverging fingers 68 and 68', respectively, at a free end of the connecting arm. The fingers have an inwardly sloping straight inner edge 69 which converge towards a restricted throat section 70, herein shown as a narrow slot 71. The narrow slot 71 may have a cutting edge 72 formed therein or in a bottom part thereof to sever the twisted link connection 9, as will be described later. A torsion spring 73 is held about the pivot pin 67 and applies outward pressure in the direction of arrows 74 to each of the fork members 65 and 65' by abutting in a free end section thereof against an arresting pin 75 secured to each of the connecting arms 66 and 66'.

Figure 11:
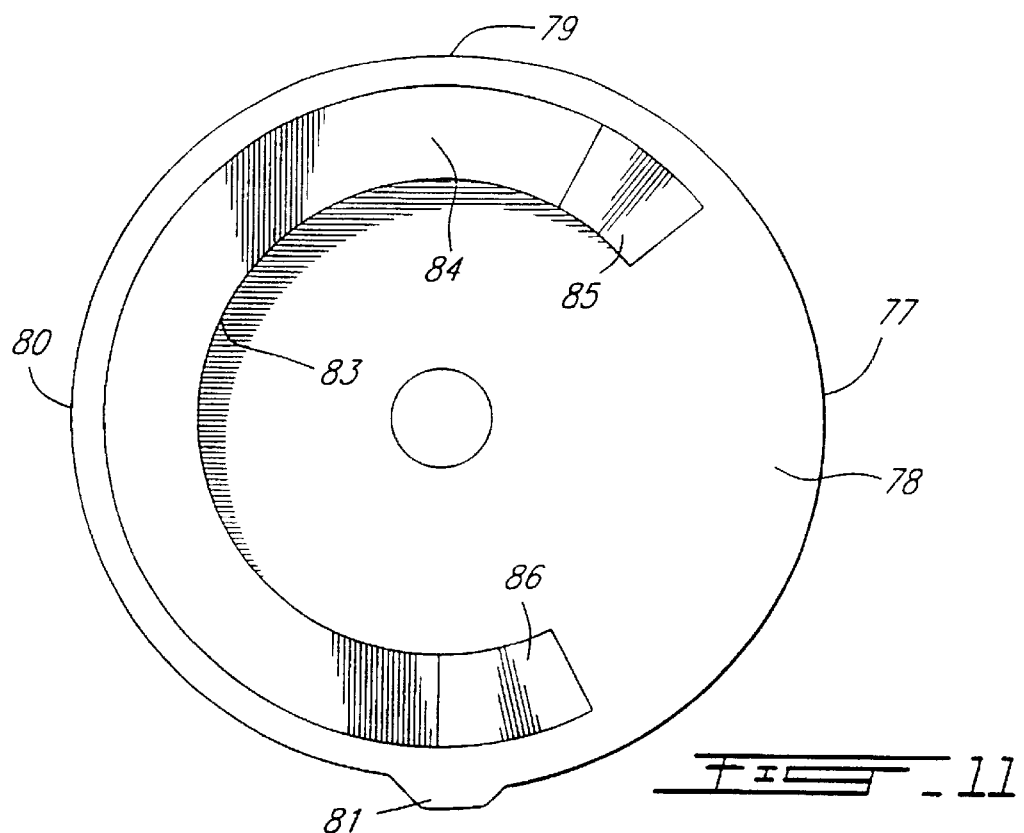
FIG. 11 is a side view of one of the control cams.
Figure 12:
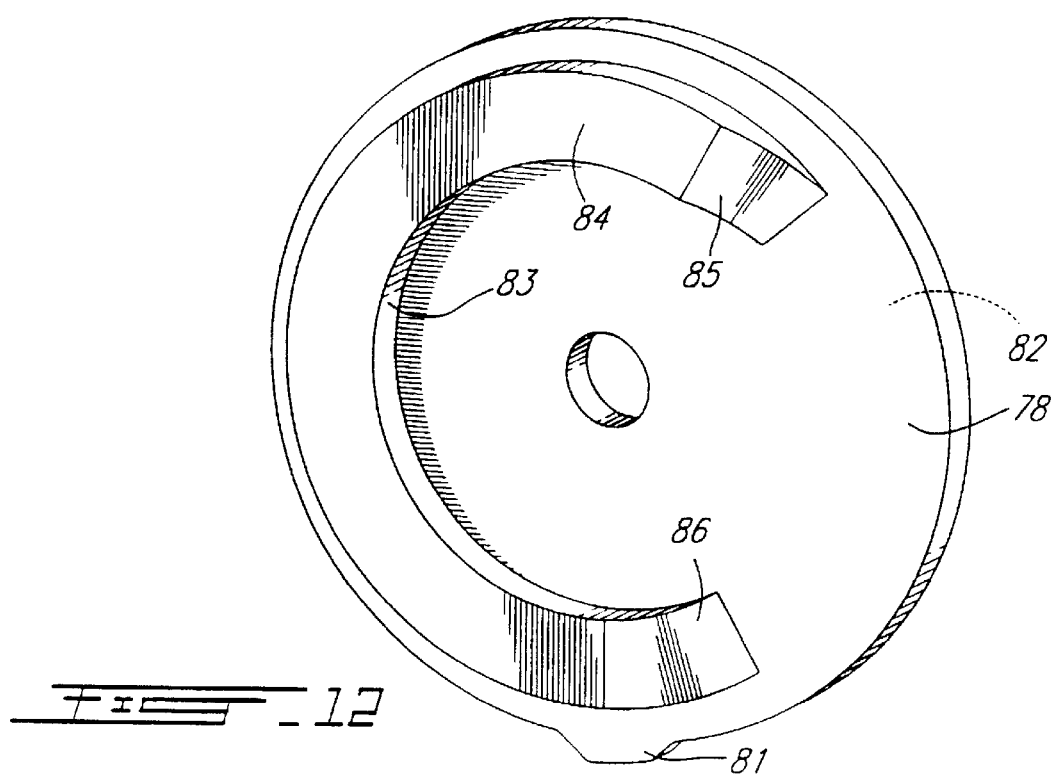
FIG. 12 is a perspective view of the control cam of FIG. 11.

A cam follower means in the form of a wheel 76 and 76' secured respectively to the fork members 65 and 65' are biased by the spring 73 against the top circumferential edge 77 and 77' of respective stationary cams 78 and 78' secured about the axle 13. As shown in FIG. 11, each of the cams, herein cam 78, is a cam disc having a slightly elliptical shape. The cam 78 in its upper section 79 defines the sausage casing receiving position of the link forming pincer mechanism and the forks are open as shown in FIG. 2. The cam 78 then follows a progressively elliptical shape whereby the link forming pincer mechanism is caused to close and remain closed during its travel through the semi-quadrant at 80. Substantially diametrically below the position 79 there is provided a short ridge portion 81 which causes the fork members 65 and 65' to reach their maximum closed severing position, as shown in FIG. 15, to sever the twisted link connection 9 between sausage links 8. After the short ridge section 81, the circumference of the cam disc again assumes an oval path which is less pronounced than the semi-quadrant 80 to cause the link forming pivotal fork members 65 to hinge out to a position as shown at FIGS. 2 and 14.

As can be seen in FIG. 14, when the cam follower wheels 76 and 76' travel on the cam section 79, the fork members are completely open to assume their maximum open position, as shown in FIG. 14, to permit the sausage casing 16 to be positioned therebetween. As shown in FIG. 2, the rotatable support rollers 23 of each of the set of rollers 18' are also separated or spaced apart at their maximum position to provide clearance to receive the sausage casing 16. These sets of rotatable support rollers 18' are actuated to and away from one another by their cam follower wheel 31 and 31', as shown in FIG. 2, which are caused to ride on an arcuate cam 83 disposed on the outer wall 82 of the discs 78 and 78'. The wheel 31 travels over an elevated arcuate cam 83 which has an elevated flat outer wall 84 and sloped end sections 85 and 86. This arcuate cam 83 is a C-shaped cam to cause the rotatable support rollers 23 of the set of rollers 18' to move toward one another from the sausage receiving position at 79 and to remain in a casing engaging position, as shown at 87 in FIG. 3, until the sausage casing 16 is severed to form sausage links at the bottom of the machine.

Figure 16:
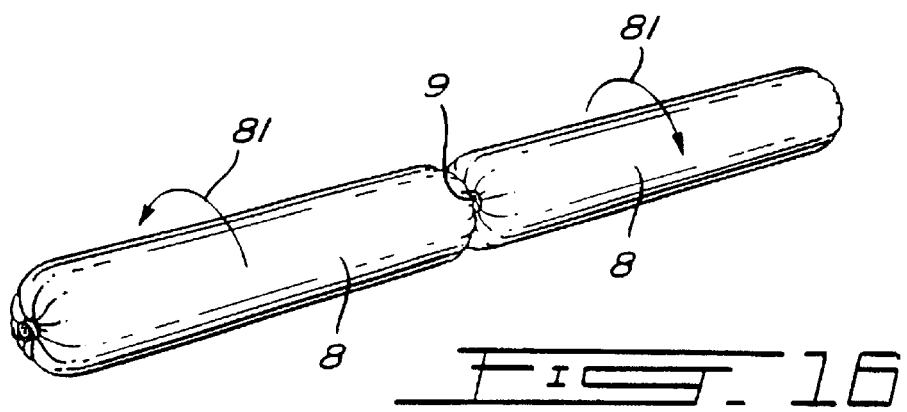
FIG. 16 is a perspective view showing how the sausage casing is formed into sausage links by the rotatable support rollers and the pincer mechanism.

As shown in FIGS. 14 and 15, a conical formation 80 may be disposed about the restrictive throat section 70 of the fork members 65 and 65' and protrude slightly outwardly to compact the foodstuff within the casings adjacent the twisted connection 9 to provide sausage ends 81, as shown in FIG. 7, wherein the ends of the sausage links 8 are compressed to provide for a twisted casing section 9' after it has been severed. Accordingly, the foodstuff within the sausage link 8 does not escape from the end 81 of the casing. As previously described, the cutting edges 72 may be provided at every second one of these pincer mechanisms to form double sausage links, as shown in FIG. 16. The interconnecting twisted casing connection 9 retains its shape due to the fact that the sausage links or the casing, prior to be severed, are twisted in opposed directions, as indicated by arrows 81 imparting a rigid twist to the skin or synthetic casing forming the connecting link 9.

In conclusion, it can be appreciated that the sausage link forming machine of the present invention is very compact, easy to repair due to the modular construction of the link forming pincer mechanism and the sausage casing grasping head assemblies and is highly efficient in the formation of sausage links having a sausage link end which is maintained substantially in a closed position by a twisted link connection prior to being severed. The construction of the machine also permits high-speed operation and is capable of producing at least 600 sausage links per minute. The modular construction of the machine also results in very few machine breakdowns and the adjustability of its grasping roller head assembly provides fine adjustment of the grasping and rotation of sausage casing sections to prevent rupture of the casing and to perform interconnecting twisted links which are sufficiently twisted to produce closed sausage ends preventing the foodstuff from escaping from the ends of the links. The open concept of the machine also permits for malfunctions to be visually detected quickly and for corrective action to be made. It also provides ease of adjustment and maintenance.

It is within the ambit of the present invention to cover any obvious modifications of the example of the preferred embodiment described herein, provided such modifications fall within the scope of the appended claims.

What is claimed is:

1. In a sausage link forming machine (10) comprising a rotating frame (11) secured on a drivable axle (13), said frame (11) having opposed parallel discs (12, 12'), control cam means (78, 78') secured to said axle (13) intermediate said discs (12, 12'), a plurality of sausage grasping head assemblies (18) secured between said discs and equidistantly spaced apart along a circular path, a link forming pincer mechanism (19) secured between each said grasping head assemblies, said grasping head assemblies (18) having rotatable support rollers (28) which are displaceable toward one another from a sausage casing receiving position (22) to a sausage casing engaging position (23), first cam follower means (31) associated with each said grasping head assemblies (18) and engaging a first cam portion (83) of said control cam means (78, 78') to displace said support rollers (28) to position same to said casing receiving position (22) and said casing engaging position (23), drive means (45, 50, 57, 58, 60) associated with each said head assemblies to impart axial rotation to said support rollers (28), said link forming pincer mechanism (19) having a pair of pivoting fork members (65, 65') defining therebetween a restricted throat area (70) to grasp and compress a portion of an elongated sausage casing (16) to form a sausage link twisted connection (9) between adjacent ones of said grasping head assemblies (18) in a portion of said rotating frame, said pivoting fork members (65, 65') supporting said elongated sausage casing (16) at said receiving section (22) of said rotating frame, at least predetermined ones of said pivoting fork members (65, 65') having severing means (72) to cut said sausage casing (16) at said twisted link connection (9) at a discharge section of said rotating frame, second cam follower means (76) associated with each said link forming pincer mechanism (19) and engaging a second cam portion (77) to cause said fork members (65, 65') to pivot to and away from one another, said forming machine being characterized in that said sausage grasping head assemblies (18) is formed by opposed sets (18') of said rotatable support rollers (28) each said sets (18') comprising a detachable support block (24) detachably connected in transverse axial alignment to a respective one of said opposed parallel discs (12, 12'), at least part of said drive means being secured to said detachable support block; said support blocks (24) are each secured to a diametrically extending open-ended block connecting slot (19') formed in a peripheral end portion of said opposed parallel discs (12, 12').

2. A sausage link forming machine as claimed in claim 1 wherein said drive means (45,50,57,58,60) of adjacent ones of said grasping head assemblies (18) imparts counter axial rotation to adjacent sausage links (8) being formed to impart an opposed twisting force (81) at opposed ends of said sausage link connection (9) in said restricted throat area (70) of said fork members (65,65').

3. A sausage link forming machine as claimed in claim 1 wherein said first cam follower means (31) is secured to a roller assembly support arm (30), a pair of roller support shafts (27) connected to a roller support frame (29) at a free end of said support arm (30), a pair of support rollers (28) connected to each said roller support shaft (27), said support shafts (27) being spaced apart in a common plane (33) and disposed parallel between said opposed parallel discs (12, 12'), said support arm (30) being connected to said support block (24) by spring biasing means (34,36), and adjustment means (37,40) to adjust the position of said common plane (33) to vary the spacing between said opposed sets (18') of said rotatable support rollers (28) to accommodate the grasping of sausage casings (16) of different diameters.

4. A sausage link forming machine as claimed in claim 3 wherein said adjustment means (37,40) is comprised of a sliding plate (40) having an engaging end (39), said plate being slidably retained in a guide slot (41) of said support block (24), said engaging end (39) being disposed in obstructing relationship with an arresting member (38) of said support arm.

5. A sausage link forming machine as claimed in claim 4 wherein said support arm (30) has a pair of connecting guide rods (34) received for close sliding fit in a pair of bores (35) provided in said support block (24), and a helical spring (36) disposed in each said bores (35) to urge said guide rods (34) and said support arm (30) away from said support block (24).

6. A sausage link forming machine as claimed in claim 5 wherein said support blocks (24) are each secured to a diametrically extending open-ended block connecting slot (19') formed in a peripheral end portion of said opposed parallel discs (12,12'), said discs (12, 12') are circular discs.

7. A sausage link forming machine as claimed in claim 3 wherein said drive means (45,50,57,58,60) is comprised by a stationary drive gear (45), a plurality of gear boxes (47) secured adjacent said stationary drive gear, each of said gear box (47) being associated with a respective one of said detachable support block (24), each said gear box (47) having a drivable gear (49) in meshing engagement with said stationary drive gear (45), said drivable gear (49) being connected to a pair of opposed roller drive sprockets (48,48') rotating in opposed directions, each said roller drive sprockets (48,48') imparting rotational axial displacement of said rotatable support rollers (28) to a respective one of opposed sausage grasping head assemblies (19) to effectuate said counter axial rotation.

8. A sausage link forming machine as claimed in claim 7 wherein each said roller drive sprockets is connected to a chain drive pivotal linkage (53,54) secured between said detachable support block (24) and said roller support frame (29).

9. A sausage link forming machine as claimed in claim 6 wherein said link forming pincer mechanism (19) is detachably secured to a support rod (20), said support rod (20) being detachably connected and adjustable in further diametrically extending open-ended rod connecting slots (21) formed in said peripheral end portion of said opposed parallel discs (12,12') and intermediate said block connecting slots (19).

10. A sausage link forming machine as claimed in claim 1 wherein said control cam means (78,78') is provided by a pair of stationary parallel cam discs (78,78') immovably secured with respect to said drivable axle (13).

11. A sausage link forming machine as claimed in claim 3 wherein each said cam disc (78,78') has an elevated arcuate cam (83) on an outer side wall (78) thereof, said cam (83) having an elevated flat outer wall (84) and sloped end sections (85,86), said cam (83) constituting said first cam portion, said cam disc (78) having a flat outer circumferential wall (77) of oval-like shape, said circumferential wall (77) having a short elevated knife actuating portion (81), said flat outer circumferential wall (77) constituting said second cam portion.

12. A sausage link forming machine as claimed in claim 11 wherein said pair of pivoting fork members (65,65') of said link forming pincer mechanism (19) each comprise a connecting arm (66,66') pivotally connected at one end to a common pivot connection (67), a pair of diverging fingers (68,68') at a free end of said connecting arm (66,66'), said diverging fingers (68,68') having inwardly sloping straight inner edges (69) converging towards said restricted throat area (70), said connecting arms (66,66' of said pair of pivoting link member (65,65') being interconnected in frictional facial contact at said common pivot connection (67), spring biasing means (73) urging said connecting arms away from one another, said second cam follower means (76) being a cam follower wheel (76) secured to each said connecting arms (66,66') and engaging a respective one of said circumferential wall (77) of said pair of parallel cam discs (78,78'), said cam discs (78,78') being shaped so that said circumferential wall (77) and said cam follower wheel (76) cause said pair of diverging fingers (68,68') to move toward one another from an open position at said casing receiving position (22) to a closed cutting position at said short elevated knife (81) actuating position.

13. A sausage link forming machine as claimed in claim 12 wherein a lower one of said diverging fingers (68) has said straight inner edge (69) thereof disposed substantially horizontal at said casing receiving position (22), and said inner edge of said other finger is disposed substantially vertically thereto to provide a channel opening to receive said sausage casing (16) therebetween.

14. A sausage link forming machine as claimed in claim 1 wherein every second one of said pincer mechanism (19) has its pivoting fork members (65,65') provided with a cutting edge (72) in said restricted throat portion (70) to form double link sausage strings (8).

15. A sausage link forming machine as claimed in claim 1 wherein there is further provided means (15) to feed an elongated sausage casing (16) at a receiving section (22) of said rotating frame (11).

* * * * *